Feb. 21, 1950     J. ERWOOD     2,498,034
DITHERING DEVICE
Filed Jan. 5, 1946
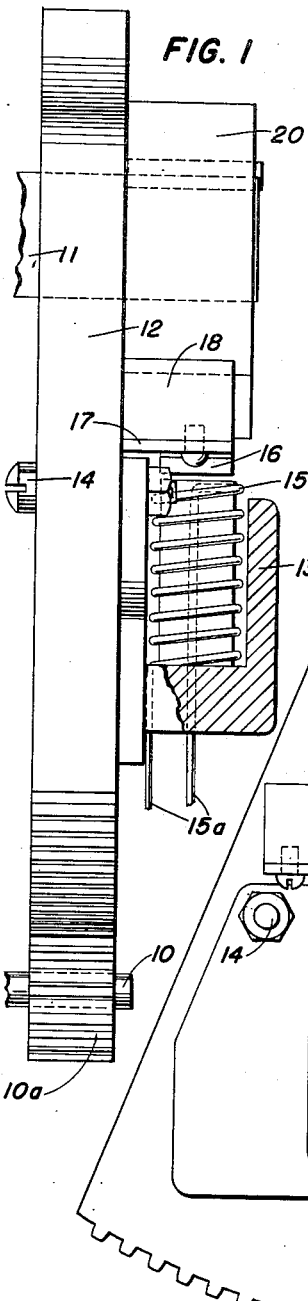
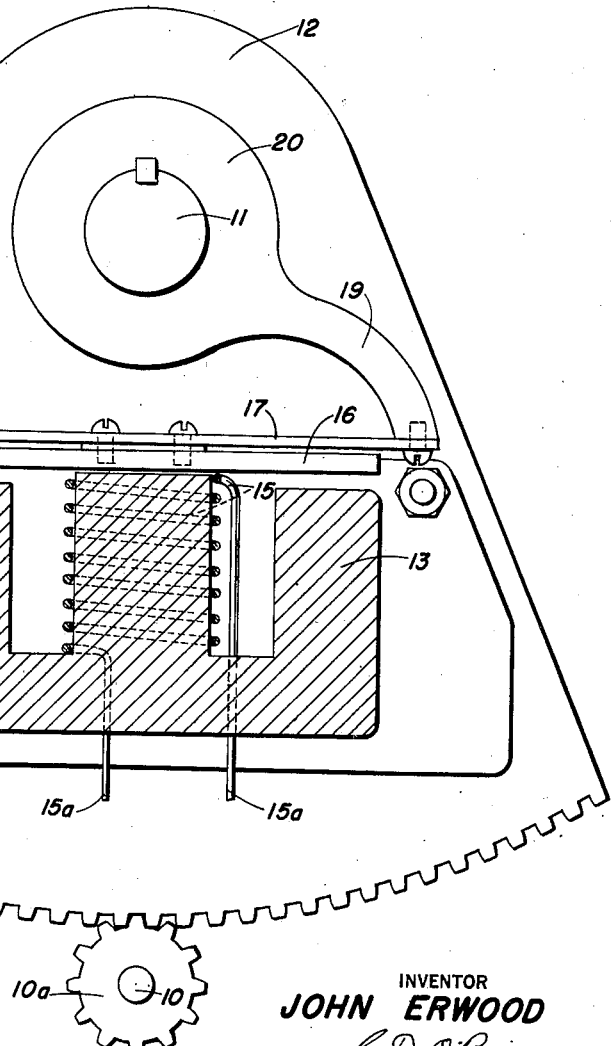
INVENTOR
JOHN ERWOOD
BY
ATTORNEY Patented Feb. 21, 1950

2,498,034

UNITED STATES PATENT OFFICE 2,498,034

DITHERING DEVICE

John Erwood, Chicago, Ill., assignor to the United States of America as represented by the Secretary of the Navy Application January 5, 1946, Serial No. 639,458

8 Claims. (Cl. 74—96)

This invention relates to dithering arrangements, and more particularly to an electro-magnetically operated dithering device which also comprises a motion transmitting agency in the mechanical power-transmitting system with which the device is used.

Dither devices are conventionally employed with mechanical power-transmission systems, such as remote control systems, to impart a vibratory motion to the elements of the system. This vibratory motion facilitates the maintenance of oil between moving parts of the various units of the system, thus keeping them from settling and making metal to metal contact and reducing the undesirable effects of static friction. The dither action also decreases the error which would otherwise accumulate in the system by nullifying cumulative play between moving parts. This is accomplished by keeping the output end of the system at the mean of this possible error.

One object of the invention is to provide a dither device which comprises a connecting element in the mechanical power transmission system with which the device is used.

Another object of the invention is to provide a dither device operated by an electro-magnet for eliminating the effects of friction and play between parts in mechanical power transmission systems.

A further object of the invention is to provide a dither device having a minimum number of moving parts and which is extremely simple in construction and highly efficient in use.

These and other objects of the invention will be apparent from the following specification and the accompanying drawings, in which:

Fig. 1 is an end elevational view, partly in section, of the improved dither device; and Fig. 2 is a front elevational view, partly in section, of the device shown in Fig. 1.

In the drawing, the dither device comprises the means for transmitting power between an input shaft 10 and output shaft 11 which is connected to the mechanical power transmission system (not shown) to which the dither motion is to be applied. Shaft 11 projects through an opening in the upper end of a wedge shaped gear segment 12 which is loosely pendent from the shaft 11. Said segment is of relatively large mass compared to the inertia of the driven shaft 11 and the load driven thereby. The segment 12 is provided on its arcuate lower end with gear teeth which engage a spur gear 10a mounted on input shaft 10.

An electro-magnet 13 is mounted by means of screws 14 on segment 12 and is provided with a coil 15 which is connected to a source of alternating current by flexible leads 15a. Magnet 13 operates an armature 16 mounted on a resilient driving member or blade 17 which has one of its ends secured to a block 18 fixed to segment 12, and its other end secured to a lever arm 19 extending radially from a hub 20 keyed to the shaft 11. In a broad aspect, the armature 16 and member or blade 17 constitute a drive coupling which can be generalized as a flexible armature, the ends of which are operatively connected to the respective shafts 10, 11. It is to be observed that the blade 17 is disposed normal to a plane joining the axes of the shafts 10, 11 between which it is situated, for that reason providing a driving member of adequate stiffness in the general direction of transmission of motion, even though it is relatively thin and resilient.

In operation, the dither device serves as a means for transmitting motion from shaft 10 to shaft 11 and at the same time imparts a dither motion to shaft 11 as will now be explained. When the coil 15 is energized with an A. C. potential, the armature 16 is caused to vibrate and the vibratory motion is transmitted to the shaft 11 through member 17, lever 19, and hub 20. Because of the relatively great mass of segment 12 compared to the inertia of driven shaft 11 and the transmission system attached thereto, the minute oscillatory movement caused by the intermittent operation of magnet 13 is imparted to the shaft 11 and is thereby transmitted to the mechanical power transmission system (not shown) to overcome the effects of friction and play in the system. Because of said relatively great mass of segment 12, it remains substantially stationary except for movement imparted to it by shaft 10 through the spur gear 10a.

It is obvious that I have invented a novel dither device which at the same time serves as a driving connection in a mechanical power transmission system.

It is to be understood that the above described device is merely a preferred embodiment of the invention, and that the invention is not to be limited thereto but is intended to cover all embodiments falling within the scope of the appended claims.

I claim:

1. A device for transmitting motion from a driving element to a drivable element, comprising a drive transmitting member of relatively high inertia compared to the inertia of the drivable element, said drive transmitting member being movable with respect to said drivable element, means for transmitting motion from said driving element to said drive transmitting member, and means including a dither mechanism mounted on said drive transmitting member for transmitting to said drivable element the motion from said driving element combined with a dither motion.

2. A device for transmitting motion from a driving element to a drivable element, comprising a drive transmitting member of relatively high inertia compared to the inertia of the drivable element, said drive transmitting member being movable with respect to said drivable element, means for transmitting motion from said driving element to said drive transmitting member, and means including an intermittently operated electro-magnet mounted on said drive transmitting member and constructed and arranged to react both upon said drive transmitting member and upon said drivable element for transmitting to said drivable element motion from said driving element combined with a dither motion.

3. A device for transmitting motion from a driving shaft to a drivable shaft, comprising a drive transmitting member of relatively high inertia compared to the inertia of the drivable shaft, said member being movable by said driving shaft and being movable with respect to said drivable member, and an intermittently actuated electro-magnet having an armature attached to the drive transmitting member and adapted to transmit its motion to said drivable shaft, whereby motion from said driving shaft is combined with a dither motion and imparted to said drivable shaft.

4. A device for transmitting motion from a driving shaft to a drivable shaft, comprising a drive transmitting member of relatively high inertia compared to the inertia of the drivable shaft, said member being movable by said driving shaft and being movable with respect to said drivable shaft, an intermittently actuated electro-magnet mounted on said drive transmitting member, an armature operated by said magnet and having one of its ends fixed to said drive transmitting member, and a lever arm keyed to said drivable shaft and attached to said armature, whereby motion from said driving shaft is combined with an oscillatory dither motion and transmitted to said drivable shaft.

5. A device for transmitting rotary motion from a driving gear to a drivable shaft, comprising a gear segment loosely mounted on said drivable shaft and operably engaging said driving gear for actuation thereby, said gear segment being of relatively great inertia compared to the inertia of said drivable shaft, an intermittently actuable electro-magnet mounted on said gear segment, an armature operable by said magnet, a flexible connecting member carrying said armature and being fixed at one end to said gear segment, and a lever arm keyed to said drivable shaft and attached to the free end of said connecting member, whereby the motion of said driving gear is combined with an oscillatory dither motion and transmitted to said drivable shaft.

6. A dither device for imparting oscillatory motion to one of a pair of turnable shafts, comprising a flexible armature operably connected at each of its ends to the respective shafts, and an intermittently energized electro-magnet for operating said armature, whereby oscillatory motion is imparted to said one shaft.

7. The combination of turnable driving and drivable elements, a drive coupling situated between the elements comprising a blade fixedly secured at its ends to the respective elements and disposed normal to a plane joining the axes of the driving and drivable elements, and means supported by one of the elements for vibrating the blade.

8. The combination of turnable driving and drivable elements, a support loosely pendent from one of the elements and having drivable connection with the other element, a drive coupling situated between the elements comprising a blade fixedly secured at its respective ends to the support and to said other element, and means carried by the support for vibrating the blade.

JOHN ERWOOD.

REFERENCES CITED

The following references are of record in the file of this patent:

UNITED STATES PATENTS

| Number | Name | Date |
|---|---|---|
| 1,239,644 | Tuttle | Sept. 11, 1917 |
| 1,487,402 | Roucka | Mar. 18, 1924 |
| 2,384,987 | Dudley | Sept. 18, 1945 |